United States Patent

[15] 3,682,172

Freedman et al.

[45] Aug. 8, 1972

[54] PARABIOTIC DIALYSIS APPARATUS

[72] Inventors: Frank B. Freedman, 3430 Boone Avenue, S., Minneapolis, Minn. 55426; Julius J. Friedman, 5824 N. Victoria Drive, Indianapolis, Ind. 46208; Bruce P. Williams, 5125 W. 10th-Apt. 34, Indianapolis, Ind. 46224

[22] Filed: Jan. 4, 1971

[21] Appl. No.: 103,547

[52] U.S. Cl. ............................... 128/214 B, 210/321
[51] Int. Cl. ............................................. A61m 01/03
[58] Field of Search...... 128/214 R, 214 B, 214.2, DIG. 3; 210/321

[56] References Cited

UNITED STATES PATENTS

| 3,212,498 | 10/1965 | McKirdy et al. ........ 210/321 X |
| 3,212,642 | 10/1965 | Kylstra ...................... 210/321 |
| 3,332,746 | 7/1967 | Claff et al. .............. 210/321 X |

FOREIGN PATENTS OR APPLICATIONS

| 1,198,032 | 7/1970 | Great Britain.............. 210/321 |

OTHER PUBLICATIONS

Pavone-Macaluso et al., Lancet Oct. 1959 pp. 704–707
Pavone-Macaluso et al., Trans. Amer. Soc. Artif, Inter. Organs 1964 (Vol. X) pp. 285– 291 and 296, 297

*Primary Examiner*—Dalton L. Truluck
*Attorney*—Wicks & Nemer

[57] ABSTRACT

Parabiotic dialysis apparatus which may be safely used with humans is disclosed. Three chambers are fluidically interconnected yet separated by two membranes to enable safe and efficient transfer of substances between the blood of two organisms. One chamber is arranged to be connected into the blood circulation system of a normal human. A second chamber is arranged to be connected into the blood circulation system of a diseased human. A third chamber is arranged to hold physiological fluid. The chambers are arranged with the third chamber between the first and second chambers, and the membranes are arranged with one membrane forming the fluid boundary between the first chamber and the third chamber and the second membrane forming the fluid boundary between the second chamber and the third chamber to thus provide a fluid path from the first chamber to the second chamber which fluid path can transfer substances to and from the first and second chambers across the membranes and third chamber due to diffusion. The third chamber further allows a continual monitoring for membrane failure, and provides sufficient time to enable system operation to be stopped before a transfer of undesirable substances between the humans could occur due to such membrane failure. Apparatus for performing such continual monitoring is described.

25 Claims, 3 Drawing Figures

Patented Aug. 8, 1972 3,682,172

INVENTORS
FRANK B. FREEDMAN,
JULIUS J. FRIEDMAN,
BY BRUCE P. WILLIAMS

Hicks & Memer

ATTORNEYS

PARABIOTIC DIALYSIS APPARATUS

BACKGROUND

The present invention relates generally to dialysis of organisms and more specifically to parabiotic dialysis, i.e. dialysis of one organism against another organism.

Dialysis is a well-known technique involving the transfer of substances by diffusion across a membrane separating two solutions. When applied in treating patients having kidney disease, the conventional hemodialysis process (artificial kidney) is maintained by the convective properties of the two fluids involved. Blood brings waste materials to one side of a membrane whereupon transfer through the membrane occurs due to the physical diffusion forces. Waste material is swept away from the opposite side of the membrane by the convective properties of the moving dialysate fluid.

Conventional hemodialysis, however, requires large quantities of physiological solution which form the dialysate. Also, complex operating equipment is required to: form the dialysate, starting from a concentrated salt solution; prepare water suitable for dialysis; monitor the dialysate conductivity; monitor gross membrane failures; monitor and control temperature; and, provide a vacuum enabling water loss due to ultrafiltration.

Parabiotic dialysis apparatus also provides the means for treatment of diseases, specifically liver and kidney failure.

When utilized for kidney failure, parabiotic dialysis apparatus affords significant economical improvement in terms of both capital equipment, operating costs, and complexities and significant physiological improvement compared to conventional hemodialysis. In contrast to conventional hemodialysis which provides transfer of substances by an open-loop process, application of parabiotic dialysis provides a well-controlled, closed-loop transfer of substances due to the availability and operation of the many physiological controlling mechanisms operating in the normal human. For example, the many hormonal and nervous regulating mechanisms operating in the normal organism control the various blood component levels. Since these levels constitute an important component of the driving forces controlling the exchange of substances across a dialyzer, such exchange is well-controlled. The possibilities of too much or too little exchange for each of the blood components involved is greatly reduced during application of parabiotic rather than conventional hemodialysis. Also in addition, undesirable loss of substances, such as amino acids, divalent ions, vitamins, and the like, is minimized when parabiotic dialysis is applied since substantially equal concentrations exist in both humans and thus no driving forces exist causing their diffusive exchange.

When applied to kidney treatment, previous known parabiotic dialysis apparatus employed either: a two chamber device with blood from the diseased organisms circulating through one chamber and blood from the normal organism circulating in the other chamber with exchange taking place across one membrane which formed the boundary of both chambers; a two chamber device with blood from the diseased organism circulating through one chamber and blood from the normal organism circulating in the other chamber with exchange taking place across two substantially contiguous membranes which formed the boundaries of the two respective chambers; or two membrane tubes wrapped spirally around a rigid support all of which housed within a large fluid bath similar to that described in relation to conventional dialysis.

The one known previous application of parabiotic dialysis for liver treatment used a large well mixed fluid bath, again similar to that described in relation to conventional dialysis, and various chemical reactors for controlling the concentration of blood components in association with a chamber containing blood of the diseased organisms and a chamber containing blood from the normal organism.

All previous known parabiotic apparatus is inappropriate for or incapable of providing ultrafiltration (water removal), is inappropriate for use without large volumes of physiological solution which in turn require temperature controlling systems and other additional apparatus, or is inappropriate for or incapable of employing membrane failure detection apparatus which could signal the failure and provide sufficient time to terminate the dialysis before a transfer of undesirable blood components could occur between the blood of the separate organisms taking part in the parabiotic dialysis. In fact, it appears that the transfer of blood substances having a molecular weight in excess of several thousand, which as is well known can result in the disability or death of one or both of the participating organisms, deterred or stopped all further work in this area.

SUMMARY

The present invention solves these and other problems of prior devices employed formerly by providing parabiotic dialysis apparatus capable of blood to blood exchange of substances between a first organism and a second organism in relative safety, without the need for large quantities of dialysate (physiological solution), with relatively simple apparatus, and with a relative minimum of apparatus.

Briefly, a preferred embodiment of the present invention as applied to treatment of kidney failure is composed of a first chamber which is arranged to be connected into the blood circulation of a diseased human, a second chamber which is similarly arranged to be connected into the blood circulation of a normal human or animal, and a third chamber is arranged to hold physiological fluid. The chambers are arranged with the third chamber between the first and second chambers, and the membranes are arranged with one membrane forming the fluid boundary between the first chamber and the third chamber and the second membrane forming the fluid boundary between the second chamber and the third chamber to thus provide a fluid path from the first chamber to the second chamber which fluid path can transfer substances to and from the first and second chambers across the membranes and third chamber due to diffusion.

In the preferred embodiment, each chamber is a thin, hollow parallelepiped, with one side of each of the first and second chambers arranged to receive a membrane. When the third chamber is filled with physiological fluid and interposed between the other two chambers, waste material from the blood of the diseased human can diffuse across the membrane supported between the first chamber and the third chamber, circulate throughout the entire third chamber, diffuse across a membrane supported between the second chamber and the third chamber, and transfer into the blood of the normal human where the waste material may be removed by normal excretory bodily processes. In a similar manner, blood substances present in the normal human at normal physiological levels but low in the diseased human can transfer from the normal to the diseased human in an analogous but reversed fashion, the sequence of events initiating in the blood of the normal human. Such substances supplied to the diseased human in this manner may then be utilized for its metabolic functions.

In addition, interposition of the third chamber will allow the prevention of commingling of blood between the diseased and normal human because a membrane failure device may be employed in connection with the fluid circuit associated with the third chamber to sound an alarm and thus allow an operator or automatic system to immediately stop the dialysis process. The preferred embodiment of such a detector system used a radioactive tracer which is added to the physiological solution in the third chamber, and a Geiger counter for detecting the tracer.

It is thus an object of the present invention to provide safe and efficient parabiotic dialysis apparatus.

It is a further object of the present invention to provide safe and efficient parabiotic dialysis apparatus employing three chambers, two of which are blood containing chambers and a third of which is an intermediary chamber.

It is a further object of the present invention to provide safe and efficient parabiotic dialysis apparatus which will not allow the commingling of undesirable blood components between the two organisms upon failure of either or both membranes.

It is a further object of the present invention to provide safe and efficient parabiotic dialysis apparatus which does not require a large quantity of physiological solution for its operation.

It is a further object of the present invention to provide safe and efficient parabiotic dialysis apparatus which is relatively simple in operation and does not require constant surveillance and maintenance by skilled personnel.

It is a further object of the present invention to provide safe, simple, and efficient parabiotic dialysis apparatus which may be used in non-hospital settings, such as the home or a local clinic treatment center.

These and further objects and advantages of the present invention will become clearer in the light of the following detailed description of an illustrative embodiment of the present invention described in connection with the drawings.

Figure 1:
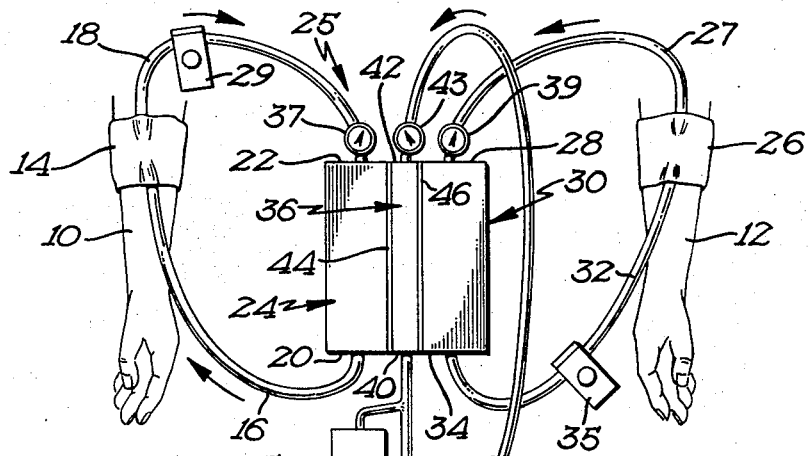
FIG. 1 shows a schematic representation of the improved parabiotic dialysis apparatus of the present invention in relation to a diseased human and a normal human, both represented by forearm portions of their bodies.

Where used in the various figures of the drawings, the same numerals designate the same or similar parts. When the terms "top," "bottom," "right," "left," "back," "vertical," and "horizontal" are used herein, it should be understood that these terms have reference only to the structure shown in the drawings as it would appear to a person viewing the drawings and are utilized only to facilitate describing the invention.

DESCRIPTION N

In FIG. 1, a diseased organism 10 and a normal organism 12, both preferably humans, are represented by forearm portions of their bodies. Thus at the onset, it should be noted that while the present invention is useful for any mammalian organism, it is primarily intended for human use, and for the purpose of description, it will hereafter be described in relation to its use with human beings. Also, for the purposes of this invention, a diseased human is defined as one having an abnormal deficiency or excess of at least one physiological substance while a normal or healthy human is defined as one not having such a deficiency or not retaining such an excess of that substance. Either may be diseased or healthy in other regards and, as will become clear, it may not affect the definition of diseased or healthy as used with respect to the present invention.

A cannulation site 14 is shown connected to the forearm of the diseased human 10 in a conventional fashion, i.e., a connection is made between a vein in the diseased human 10 and a first cannula tube 16, and a connection is made between an artery in the diseased human 10 and a second cannula tube 18. Various types of cannula devices are well known to those skilled in the art, and no further description thereof is included. Further, those skilled in the art are familiar with the tubing types which may be used for tubes 16 and 18, such as medical grade silicon rubber tubing made by Dow Corning and a further description thereof is not included.

A conventional shunt, not shown, may be used with cannula site 14 to shunt blood from tube 16 and tube 18 until the system is ready for operation. Tubes 16 and 18 are further arranged to connect to the opposite faces 20 and 22, respectively, of a first chamber 24 which is a part of the three chamber parabiotic dialysis apparatus of the present invention, generally designated 25. Thus, when the cannula shunt is removed tubes 16 and 18 provide fluid communication between the diseased human 10 and chamber 24. That is, blood is pumped by a mechanical cardiovascular pump 29 associated with tube 18 or by the heart of the diseased patient and flows from the diseased human 10 from the artery in the forearm, through tube 18 and into chamber 24, through chamber 24, out of chamber 24 and through tube 16, back to the forearm vein of human 10, and back to the circulation system of the diseased human 10. Cardiovascular pumps of this type are well known to those skilled in the art. One example is the well-known Mayo roller pump manufactured by Med-Science Electronics of St. Louis Missouri. Similarly, blood is conducted from the artery in the forearm of the normal human 12, through cannulation site 26, through cannula tube 27 connected to a face 28 of a second chamber 30 within the apparatus 25 of the present invention, through chamber 30, out of chamber 30 through a tube 32 connected to a face 34 of chamber 30 opposite face 28, through pump 35, and back to a forearm vein of the normal human 12 through cannula tube 32.

Conventional pressure gauges 37 and 39 are also employed, gauge 37 in the flow of blood through tube 18 adjacent face 22 of chamber 24 and gauge 39 in the flow of blood through tube 27 adjacent face 28 of chamber 30.

A third chamber 36 is interposed between chambers 24 and 30 in a manner hereinafter described. A physiological solution is caused to circulate within chamber 36 through a tube 38 connected between opposite faces 40 and 42 of chamber 36. For the purposes of this invention, a physiological solution is defined as a fluid which is entirely compatible with the body, such as 6 per cent dextran in saline, or a fluid which can be tolerated in small amounts, such as soybean oil, flurocarbons, and silicon fluids. Another conventional pressure gauge 43 is employed to monitor the pressure of the physiological fluid flowing through tube 38, gauge 43 positioned adjacent face 42.

With the circulation of the physiological fluid within chamber 36 and the circulation of blood within chambers 24 and 30, waste materials in blood of the diseased human 10, for example, may transfer by convection to chamber 24, diffuse through membrane 44 held between chamber 24 and chamber 36 into the recirculating physilogical fluid within chamber 36, transfer by convection across chamber 36 to membrane 46 held between chamber 36 and chamber 30, diffuse through membrane 46, and then enter the blood of the human 12 flowing within chamber 30. The waste material may then be removed from the blood of the normal human by the normal bodily excretory or metabolic processes.

A conventional pump 48 is shown adjacent tube 38 which maintains the circulation within chamber 36. Variable speed pumps of this type are well known to those skilled in the art and pumps of the vibrating type such as the "Vibrostatic" pump manufactured by the Chemical Rubber Company of Cleveland, Ohio may be used.

In the case of membrane failure, blood components from either organism 10 or 12 may flow from either chamber 24 or 30 into chamber 36 and appear in the physiological solution within chamber 36. Notice, however, that blood from the diseased human 10 and the normal human 12 will not commingle upon the failure of a single membrane. To further guarantee that blood from humans 10 and 12 will not commingle, a membrane failure detector, generally designated 50, is arranged to continuously sample the physiological solution in chamber 36 due to the presence of shunt tube 51 which intersects tube 38 to conduct a portion of the physiological fluid flowing through tube 38 through the membrane failure detector 50, through a thin window Geiger counter designated 52 having a flow through cell, and back to tube 38. Such Geiger counters are available from Wm. B. Johnson and Associates of Montville, New Jersey such as model GSM-5 Survey meter.

The preferred embodiment of the membrane leak detector 50 utilizes a radioisotope tracer molecule added to the physiological fluid in chamber 36. Therefore, if diffusion of the tracer molecule occurs due to a membrane leak, the concentration of the tracer molecule in chamber 36 is reduced, and radiation detector 52, within blood leak detector 50, detects the decreased radioactivity of the physiological fluid flowing through tube 51, as shunted from tube 38, to allow the sounding of an alarm.

Figure 2:
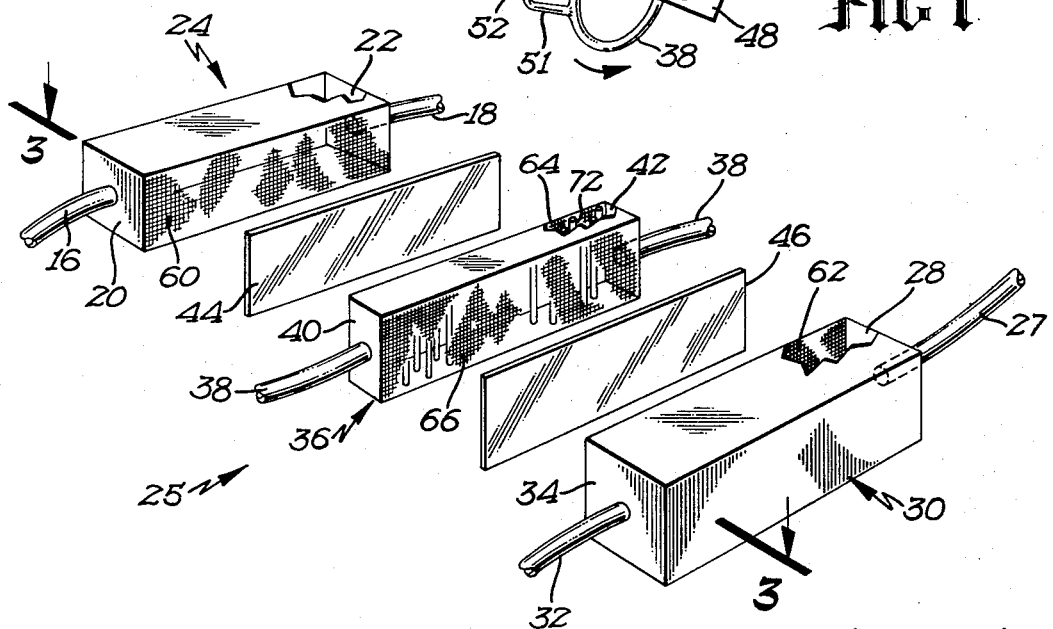
FIG. 2 shows an exploded perspective of the improved parabiotic dialysis apparatus of the present invention.
Figure 3:
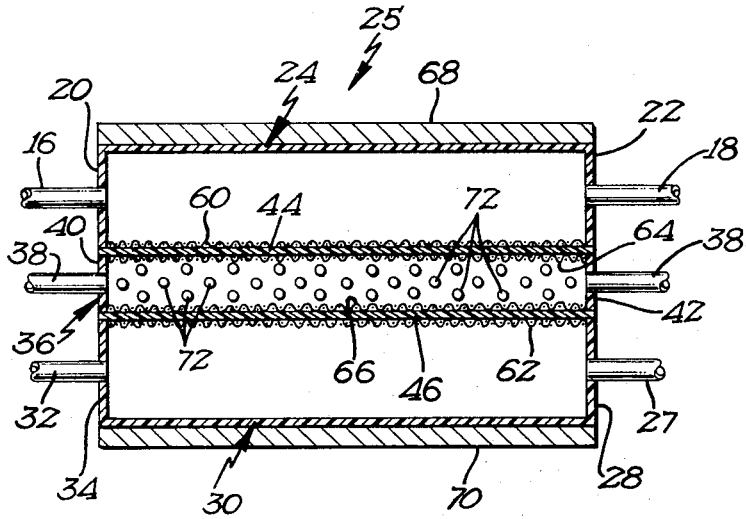
FIG. 3 shows a section of the improved parabiotic dialysis apparatus of the present invention taken along section lines 3—3 in FIG. 2.

FIGS. 2 and 3 show more detailed views of the parabiotic dialysis apparatus 25 of FIG. 1. From these figures it may be seen that first closed surface forms the chamber 24 which is designed to hold blood from the diseased human 10. Chamber 24 is shown in the preferred embodiment as a rectangular parallelepiped having end faces 20 and 22 arranged to receive tubes 16 and 18, respectively, for providing fluid communication between chamber 24 and the diseased human 10.

A side face 60 connecting end faces 20 and 22 of the rectangular parallelepiped forming chamber 24 is of a screening material to provide support for membrane 44 in the assembled parabiotic apparatus 25. Since the mesh size of screen 60 is much larger than the pore size of membrane 44, screen 60 will support membrane 44 without significantly interfering with the material transfer across membrane 44.

Chamber 24 is arranged to provide an internal volume, including the volume contained within tubes 16 and 18, of between 50 and 500 cubic centimeters. Good results can be obtained using a volume of 300 cubic centimeters. If chamber 24 is of insufficient volume, blood flow will be impeded, and, the overall transfer of waste materials will be greatly reduced. If the volume of chamber 24 is too large, an excess amount of blood will be required from the diseased human, and various well known undesirable effects may result.

Similarly, a second closed surface forms the chamber 30 which is designed to hold the blood of the normal human 12. Chamber 30 is shown, in the preferred embodiment, in the form of a rectangular parallelepiped having end faces 28 and 34 arranged to receive cannula tubes 27 and 32, respectively, for providing fluid communication between chamber 30 and the normal human 12.

A side face 62 of the rectangular parallelepiped forming chamber 30, adjacent side face 60 of chamber 24, is also of a screening material to provide support for membrane 46 in the assembled parabiotic apparatus 25 similarly to the manner in which screen 60 provides support for membrane 44.

Chamber 30 is arranged to provide an internal volume including the volume contained within tubes 27 and 32, of between 50 and 500 cubic centimeters. Good results can be obtained using a volume of 300 cubic centimeters. The upper and lower volume limits are gain governed by the considerations given above with respect to chamber 24.

A third closed surface forms the chamber 36 which is designed to hold the physiological solution forming the interface between the blood of the diseased human 10 and the blood of the normal human 12. Chamber 36 is shown in the preferred embodiment of the figures in the form of a rectangular parallelepiped having end faces 40 and 42 arranged to receive the opposite ends of tubes 38 for providing a fluid conduit allowing the physiological solution within chamber 36 to recycle. A first side face 64 of the rectangular parallelepiped forming chamber 36 is arranged to lie adjacent side face 60 of chamber 24 and is further formed of a like screen material to provide additional support for membrane 44 in the assembled condition of parabiotic apparatus 25 between screen face 60 of chamber 24 and screen face 64 of chamber 36. A second side face of the rectangular parallelepiped forming chamber 36 is arranged adjacent screen face 62 of chamber 30 and is further of a like screen material to thus support membrane 46 between screen face 66 of chamber 36 and screen face 62 of chamber 30 in the assembled condition of parabiotic apparatus 25.

Bilateral support for membranes 44 and 46 is not always necessary and depends upon the particular application of parabiotic dialysis apparatus 25 of the present invention. For example, in the preferred application to kidney disease, screen faces 60 and 66 are not necessary since the fluid flow rates and hence fluid pressure in chambers 24, 36 and 30 can be controlled to increase from chamber 24 to chamber 30 by controlling the speed and position of pumps 29, 35 and 48 and hence the pressure on membranes 44 and 46 can be controlled to be in a direction from chamber 24 towards chamber 30. Thus, screen faces 64 and 62 may adequately support membranes 44 and 46, respectively, while preventing gross bulging of the membranes.

Chamber 36 has been found to operate properly with volumes from 200 to 2,000 cubic centimeters, which includes the volume contained within tubes 38 and 51. Good results can be obtained using a 1,000 cubic centimeter volume. If the volume of chamber 36 is too large, excessively large volumes of physiological solution are required, and an excessive quantity of radioisotope tracer is required. On the other hand, if the volume of chamber 36 is insufficient fluid flow throughout chamber 36 is impeded, resulting in decreased fluid mixing and an attendant efficiency decrease in parabiotic dialysis apparatus 25.

The areas of both membranes 44 and 46 range between 0.2 and 3.0 square meters. Good results can be obtained using a surface area of 1.0 square meters for both membranes 44 and 46. Increasing membrane areas require increased chamber volumes, the consequences of which have been previously discussed. A smaller membrane area reduces the area available for transfer of blood components, thereby decreasing the efficiency of the parabiotic dialysis.

It will be realized by those skilled in the art that the inside surfaces of chambers 24 and 30 must present a surface compatible with blood, as must all surfaces of the present invention coming into contact with blood. That is, these surfaces must be inert and non-reactive to body tissue and not significantly change in permeability throughout the period of parabiotic dialysis. Screening which is in contact with blood can be either coated with Dow Corning Silastic Rubber or can be fabricated from existing collagen fibers. Cellophane and cuprophane membranes are also well known to those skilled in the art and meet this criteria.

When applied to the treatment of kidney failure, a preferred embodiment of membranes 44 and 46 have a molecular weight cut-off of approximately 5,000–10,000, i.e. beyond the 5,000–10,000 molecular weight, transfer through the membrane is impeded or blocked. Examples of such membranes are collagen membranes available from the Japanese Leather Company through Dr. Rubin at Columbia University, or cellophane or cuprophane membranes unilaterally stretched and/or acetylated according to the technique of Craig. Further, commercially available cellophane and cuprophane membranes which are utilized by existing hemodialyzers may be used when unilaterally stretched and/or acetylated according to the technique of Craig. Collagen membranes possess the appropriate pore sizes to allow passage of bodily waste and yet restrict passage of blood protein.

Many known physiological solutions may be used to fill chamber 36. One such physiological solution is "Dextran 70" (6 percent Dextran in normal saline) as manufactured by Cutter Laboratories.

The assembled condition of the parabiotic dialysis apparatus 25 of the present invention is shown in FIG. 3 where two supporting plates 68 and 70 are arranged along the outside faces of chamber 24 and chamber 30. By drawing support plates 68 and 70 together and securing them by conventional means, not shown, chambers 24, 36 and 30 are drawn into fluidic contact.

In particular, in the assembled condition of parabiotic dialysis apparatus 25, a first face of membrane 44 is arranged to directly contact the blood within chamber 24 and a second face of membrane 44 is arranged to contact the physiological solution in chamber 36. Thus, the membrane 44 forms an interface between chamber 24 and chamber 36.

Further, a first face of membrane 46 is arranged to contact the physiological solution of chamber 36 and a second face of membrane 46 is arranged to contact blood within chamber 30. Thus, the membrane 46 forms an interface between chamber 36 and chamber 30.

Appropriate gasketing material should be placed along the outer periphery of the membranes on both sides to assure the maintenance of a proper seal and the avoidance of system leaks. Appropriate gasket material that is compatible with body tissues is well known to those skilled in the art.

As best shown in FIG. 3, a plurality of projections 72 are arranged throughout chamber 36 between the top and bottom faces thereof with their axes substantially parallel to the planes of faces 64 and 66 of this chamber. Projections 72 are arranged to cause a turbulence within chamber 36 to obtain good mixing of the physiological fluid to provide a representative sample of the physiological fluid for the membrane failure detector 50 and minimize boundary layers in chamber 36. Projections 72 thus enhance the transfer of material across chamber 36 by insuring a nearly uniform concentration within this chamber.

As indicated, mechanical cardiovascular blood pumps 29 and 35 or the heart of each human, not shown, maintains the circulation of blood within the respective chambers to which they are attached. Further, pump 48 maintains the recirculation of physiological solution within chamber 36. Fluid flow on both sides of membrane 44 and 46 determine the transmembrane pressures that exist during operation of the parabiotic dialysis apparatus. For application to kidney deficiency, as discussed earlier, it is desirable to maintain the membrane size of individual pores such that passage of substances of molecular weight greater than 5,000 to 10,000 is impeded or locked. The interrelationships of factors governing this restriction are Poison's ratio, membrane adiabatic bulk modulus, transmembrane pressure, screening material geometry and other physical properties well known to those skilled in the art of materials science. The flow of fluid on either side of membrane 44 or 46 may assume any direction relative to one another, however, good results can be obtained when the flow of blood in chamber 24 and physiological solution in chamber 36 is parallel or co-current.

OPERATION

The operation of the preferred embodiment of the present invention will be described with reference to the dialyzing of a human 10 with a kidney disease which prevents the excretion of certain waste materials against a human 12 having normal bodily excretory processes. Once the preferred embodiment of the parabiotic dialysis apparatus of the present invention is described for this use, its extension to other uses is within the normal skill in the art.

In general, the parabiotic dialysis apparatus 25 of the present invention operates by providing a fluidic path between the blood of a human 10 with a kidney disease and the blood of a normal human 12, while physically separating each blood supply, to allow the high concentration of waste material in the blood of the diseased human to diffuse into the blood of the normal human for removal by normal bodily excretory processes. The respective blood supplies are separated by two membranes which allow the transfer of waste substances and prevent the transfer of blood protein. That is, waste substances such as urea, creatinine, water, and potassium having molecular weights of 60, 113, 18 and 39, respectively, can pass from the blood of the diseased human, through the membranes, and into the blood of the normal human where these substances are removed from the blood by the normal excretory processes of the normal human. During this transfer, however, the molecular weight cutoff of the membranes of approximately 5,000 to 10,000 discussed hereinbefore prevents the undesirable passage of blood components ranging in molecular weight from 5,000 to 10,000 and upward.

Further, since the parabiotic dialysis apparatus 25 of the present invention includes a third chamber separating the chamber containing the blood of the diseased human 10 from the chamber containing the blood of the normal human 12 and two membranes, one positioned between each blood chamber and the third chamber, if a membrane failure occurs, membrane failure detection apparatus 50 is provided to sound an alarm and enable an operator or an automatic process to terminate the dialysis with sufficient time to avoid any transfer of undesirable blood components from one human to the other, with its possible deleterious effects, including death.

As a first step, physiological fluid (6 percent dextran in saline), 24, 30, and 36, and their associated tubing is added to all three chambers. An anticoagulant, such as heparin, is injected into both humans before initiating parabiotic dialysis to retard the clotting of blood that occurs when blood comes in contact with foreign surfaces. Throughout the parabiotic dialysis, additional heparin is either added continuously at low levels or periodically.

A radioactive tracer is added directly into the middle chamber using a syringe and needle. In this application, Insulin-I131 having a molecular weight of approximately 5,700 is used as the radioisotope tracer. Insulin-I131 is available from Volk Radiochemical. Air bubbles are removed from tube 38, pump 48 is energized, and the recycling of fluid within the third chamber 36 is initiated. After allowing for complete mixing of the tracer with physiological fluid in chamber 36, the radioactivity of the fluid within third chamber 36 is measured by the Geiger counter 52. The membrane failure detection system 50 is then tested by replacing approximately 10 percent of the fluid within the chamber 36 with nonradioactive physiological solution (6 percent dextran in saline), and an alarm signal from membrane failure detection apparatus 50 should result, thereby indicating a proper functioning membrane failure detection system, as will be discussed in detail hereinafter. After resetting the alarm signal, which has now been adjusted to sense a 10 percent decrease of radioactivity from the given baseline value, all membranes are next examined for leaks by noting the radioactivity of the recycling fluid over the next 5 to 10 minute period, a constant value indicating the absence of membrane leaks.

The cannula shunt is removed from the normal human 12, cannula tubes 27 and 32 inserted, and air bubbles are removed from tubes 27 and 32. The cannula shunt is then removed from the diseased human 10, cannula tubes 16 and 18 inserted, and air bubbles are removed from tubes 16 and 18. The flow rates in chambers 24 and 30 are adjusted gradually to the appropriate level, usually between 100–300 milliliters per minute by adjusting the speed of the two cardiovascular pumps.

The parabiotic dialysis run is thus begun, and will continue for the next 6 to 12 hours depending upon the waste levels within the diseased human, the operating parabiotic dialysis apparatus parameters chosen from the body weights and waste levels of the respective levels, as normally determined by the attending physician.

Recirculation flow rates of physiological solution within chamber 36 and blood within chamber 30 may also be varied to control the water loss from the diseased human 10 to the normal human 12 by ultrafiltration. Ultrafiltration will occur as long as the pressure of fluid entering chamber 24 at face 22 is greater than the pressure of fluid entering chamber 36 at face 42, and pressure of fluid entering chamber 36 at face 42 is greater than the pressure of fluid entering chamber 30 at face 28. By placing cardiovascular pump 29 in association with tube 18 and cardiovascular pump 35 in association with tube 32 and adjusting the speed of pump 48, the pressure differences required for ultrafiltration as discussed above can be maintained. For the chamber volumes indicated herein of 300 cubic centimeter for chambers 24 and 30 and 1,000 cubic centimeters for chamber 36, for membrane surface areas of 1.0 meter for each of membranes 44 and 46, and for parallel or co-current flow as described herein, 8 hours has been found sufficient for transfer of sufficient waste products from a diseased human of approximately 150 pounds body weight to a normal human of like weight to lower the concentration of waste products in the diseased human to values approaching the normal human.

It may now be appreciated that no heat exchanger is required with the apparatus 25 of the present invention since the amount of body heat removed from either human as blood passes through the parabiotic dialysis apparatus is sufficiently small that the normal temperature regulatory processes functioning in each human can adjust for any loss. Further, it is apparent that the parabiotic dialysis apparatus 25 of the present invention is inexpensive when compared to conventional hemodialysis, at least because a much smaller volume of physiological solution, referred to as dialysate for conventional hemodialysis, is required.

Also, considerably less operating equipment is required and the overall complexity of operation is reduced for parabiotic dialysis 25 of the present invention when compared to conventional hemodialysis. Training costs, capital equipment costs and operating expenses are all greatly reduced. In addition, maintenance and operating time of all personnel involved are also greatly reduced.

In contrast to conventional hemodialysis which provides transfer of substances by an open-loop process, application of parabiotic dialysis provides a well-controlled, closed-loop transfer of substances due to the availability, and hence, operation of the many physiological controlling mechanisms operating in the normal human. This prevents over or under compensation of material transfer, and in addition, prevent unnecessary loss of some substances such as amino acids, vitamins, hormones, glucose, and the like, which are normally lost during conventional hemodialysis.

Further, the parabiotic apparatus 25 of the present invention allows a significantly superior ability to sense system failures and provide an alarm in a sufficient time to prevent any deleterious affects to either human. In particular, since two membranes (44 and 46) are used, a failure of a single membrane will not allow the intermixing of blood between the diseased human and the normal human which could result in well known side effects, including death. Membrane leak detector 50 of the present invention provides an alarm if either one or both membranes develop a leak sufficient to transfer blood protein into the intermediary chamber 36. The manner in which membrane leak detector 50 operates to provide such an alarm may now be explained.

As explained above, membranes are available which can be utilized to maintain the molecular weight cut-off of 5,000 to 10,000 so that commingling of undesirable blood substances is prevented. For example such membranes as cellophane or cuprophane which are unilaterally stretched and/or acetylated according to the technique of Craig may be used. Thus, waste substances such as urea, creatinine, water and potassium having molecular weights of 60, 113, 18 and 39 will easily pass from the blood of the diseased human within chamber 24 through membrane 44, through the physiological solution within chamber 36, through membrane 46 and into the blood of the normal human within chamber 30 where they may be removed from the blood of the normal human 12 by normal excretory processes.

During this transfer, however, the 5,000 to 10,000 molecular weight cut-off of membranes 44 and 46 prevent the undesirable passage of macromolecular blood components ranging in molecular weight from 10,000 and upward. Transfer of such macromolecular blood substances is not considered safe due to possible ensuing immunological reactions.

If, however, a membrane failure occurs, such a failure would be sensed by membrane failure detector apparatus 50 and specifically by a decrease in the radioactivity sensed by Geiger counter 52 which continually samples the recirculating physiological fluid within chamber 36 by means of shunt tube 51. A decrease in radioactivity would be immediately sensed because a membrane leak would cause physiological fluid within third chamber 36 to flow from chamber 36, through the ruptured membrane, and into another chamber. Thus, a dilution of the radioisotope tracer would occur, which dilution would decrease the level of radioactivity in the physiological fluid within chamber 36, and the detector 50 would sound an alarm and enable an operator or an automatic process to terminate the dialysis with sufficient time to avoid any transfer of undesirable blood components from one human to the other.

The use of Insulin-I131, which has a molecular weight of approximately 5,700 is particularly advantageous with membranes having molecular weight cut-offs of 5,00 to 10,000 since the Insulin-I131 is considerably smaller than those blood components whose transfer from one organism to another upon membrane failure is undesirable. Thus, the probability of Insulin-I131 transmembrane diffusion is much greater than of any undesirable blood components. Further, in the case of a single or double membrane failure, sufficient time is available to terminate the treatment before commingling of undesirable blood components occurs because the recirculation time of the physiological fluid within chamber 36 is much less than the waste product convection or transfer time across chamber 36. Thus, in practice several cycles of physiological fluid within chamber 36 are required before a molecule appearing in chamber 36 at one membrane face is transferred to the face of the other membrane in chamber 36. This convection time allows ample opportunity for the dilution of the Insulin-I131 concentration and the resultant decrease in radioactivity within the physiological fluid within chamber 36 which will cause the initiation of the alarm by means of membrane failure detector 50.

The maximum pore size of membranes 44 and 46 are therefore determined by each particular application of parabiotic dialysis apparatus 25. That is, the membrane pore size is determined by what substances are desired to be passed and what substances are desired to be held back. Maximum pore size is also limited in order to eliminate the possibility of transmembrane exchange of undesirable macromolecules which are not considered safe due to possible ensuing immunological reactions.

Once the membrane pore size is chosen, the radioactive tracer molecule may be chosen such that its physical size will not normally pass through the membrane (e.g., the tracer molecular only passes upon a membrane failure). Thus, the radioactive tracer molecular is chosen by size so that its molecular radius is greater than the pore size of either membrane 44 or 46, which pore size is governed by the intended application of parabiotic dialysis apparatus 25, and the tracer molecule is chosen such that it is capable of being detected.

Now that the basic teachings of the present invention have been explained, many extensions and variations will be obvious to one having ordinary skill in the art. For example while the specific geometries shown have particular advantages, many other geometries can be used according to the teachings of the present invention. Chambers 24, 30 and 36 may take the form of spiral coils, or other known geometries, for ease of manufacturing or specific application. In fact, chambers 24 and 30 may each take the form of tubular cellophane membrane material with chamber 24 fitting wholly within chamber 36 and chamber 36 fitting wholly within chamber 30.

Similarly, while cylindrical projections 72 have been shown within chamber 36 to create a turbulence and maintain a well mixed solution, many other baffles, protrusions, or other projections may be used.

Likewise, while the present invention has been described for parallel or co-current flow, that is, fluid entering the parabiotic apparatus 25 through tube 18, the top end of tube 38 as shown in FIG. 1, and tube 27, many other types of flow are possible. For example fluid entering tubes 18, 27 and the bottom of tube 18 establish one counterflow scheme. Many permutations and combinations of flow directions are possible using the teachings of the present invention.

Furthermore, while the present invention has been described in relation to removing deleterious waste materials from the body of a human with kidney disease, it will become immediately apparent to those skilled in the art that the identical mechanisms may be used to supply a missing or abnormally low substance such as sodium, amino acids, and the like, which are normal components of human blood. In these examples, the molecular size is such that no change in the system as described is necessary.

Furthermore, while the present invention has been described in relation to its application for kidney treatment, it will become immediately apparent to those skilled in the art that the parabiotic dialysis apparatus may be used for other applications such as an artificial placenta, an artificial intestine, or an adjunct to open heart surgery. Other applications of the parabiotic dialysis apparatus of the present invention may require modifications of the apparatus described above such as: membranes having larger or small pore sizes; membranes allowing transfer of blood substances having a specific range of molecular weight range such as by the insertion of multiple rather than single membranes; and, utilization of several parabiotic dialysis apparatus simultaneously, each having differing membrane permeabilities and thereby enabling a more selective membrane exchange across each parabiotic dialyzer.

Thus, since the invention disclosed herein may be embodied in other specific forms without departing from spirit or general characteristics thereof, some of which forms have been indicated, the embodiments described herein are to be considered in all respects illustrative and not restrictive. The scope of the invention is indicated by the appended claims, rather than by the foregoing description and all changes which come within the meaning and range of equivalency of the claims are intended to be embraced therein.

What is claimed is:

1. Apparatus for blood to blood exchange of substances between a first organism and a second organism, comprising in combination:
   a. a first closed surface forming a first chamber designed to hold blood
   b. first conduit means fluidically communicating with the first chamber and arranged to attach to cannulation means associated with the first organism for supplying blood from the first organism to the first chamber;
   c. second conduit means fluidically communicating with the first chamber and arranged to attach to cannulation means associated with the first organism for returning blood from the first chamber to the first organism;
   d. a second closed surface forming a second chamber designed to hold blood;
   e. third conduit means fluidically communicating with the second chamber and arranged to attach to cannulation means associated with the second organism for supplying blood from the second organism to the second chamber;
   f. fourth conduit means fluidically communicating with the second chamber and arranged to attach to cannulation means associated with the second organism for returning blood from the second chamber to the second organism;
   g. a third closed surface forming a third chamber designed to hold a physiological fluid;
   h. first membrane means, forming at least a portion of the first surface, having a first face arranged to contact blood within the first chamber and having a second face arranged to contact physiological fluid within the third chamber to form an interface between the first chamber and the third chamber;
   i. second membrane means, forming at least a portion of the second surface, having a first face arranged to contact blood within the second chamber and having a second face arranged to contact physiological fluid within the third chamber to form an interface between the second chamber and the third chamber;
   j. fifth conduit means having first and second ends with the ends fluidically communicating with the third chamber to allow the physiological fluid within the third chamber to recycle;
   k. pump means connected to the fifth fluid conduit means, the pump means being designed to continually recycle the physiological fluid within the third chamber; and
   l. detector means positioned in relation to the third chamber so as to continually monitor the physiological fluid in the third chamber and provide an alarm indicating a membrane leak.

2. The apparatus of claim 1 wherein the volume of the third chamber is not substantially greater than 2,000 cubic centimeters.

3. The apparatus of claim 2, wherein the volumes of the first chamber and the second chamber are each not substantially greater than 500 cubic centimeters.

4. The apparatus of claim 3, wherein the first and second membrane means each have surface areas not substantially greater than 3 square meters.

5. The apparatus of claim 4, wherein:
a. the first conduit means includes second pump means for causing the pressure of fluid within the first chamber to exceed the pressure of fluid within the third chamber; and
b. one of the third fluid conduit means and fourth fluid conduit means includes third pump means for causing the pressure of fluid within the second chamber to be less than the pressure of fluid within the third chamber for providing ultra filtration from the first organism to the second organism.

6. The apparatus of claim 5, wherein parallel fluid flow is arranged within the first and third fluid conduit means, and wherein the third pump means is associated with the fourth fluid conduit means.

7. The apparatus of claim 4, wherein the detector means includes a radiation detector.

8. The apparatus of claim 4, wherein the detector means comprises a radiation detector arranged to provide an alarm upon a fixed percentage decrease in the amount of a radioactive tracer within the physiological solution within the third chamber with respect to the original preset concentration of radioactive tracer.

9. The apparatus of claim 4, wherein the volume of the third chamber is not substantially greater than 1,000 cubic centimeters.

10. The apparatus of claim 9, wherein the volumes of the first chamber and the second chamber are each not substantially greater than 300 cubic centimeters.

11. The apparatus of claim 10, wherein the first and second membrane means each have surface areas not substantially greater than one square meter.

12. The apparatus of claim 11, wherein:
a. the first conduit means includes second pump means for causing the pressure of fluid within the first chamber to exceed the pressure of fluid within the third chamber; and
b. one of the third fluid conduit means and fourth fluid conduit means includes third pump means for causing the pressure of fluid within the second chamber to be less than the pressure of fluid within the third chamber for providing ultra filtration from the first organism to the second organism.

13. The apparatus of claim 12, wherein parallel fluid flow is arranged within the first and third fluid conduit means, and wherein the third pump means is associated with the fourth fluid conduit means.

14. The apparatus of claim 11, wherein the detector means includes a radiation detector.

15. The apparatus of claim 11, wherein the detector means comprises a radiation detector arranged to provide an alarm upon a fixed percentage decrease in the amount of a radioactive tracer within the physiological solution within the third chamber with respect to the original preset concentration of radioactive tracer.

16. The apparatus of claim 11, wherein the maximum maintainable size of any individual pore of the first membrane means is such that the first membrane means is substantially impermeable at least to molecules of molecular weight greater than 10,000.

17. The apparatus of claim 16, wherein the maximum maintainable size of any individual pore of the second membrane means is such that the second membrane means is substantially impermeable at least to molecules of molecular weight greater than 10,000.

18. The apparatus of claim 1, wherein:
a. the first conduit means includes second pump means for causing the pressure of fluid within the first chamber to exceed the pressure of fluid within the third chamber; and
b. one of the third fluid conduit means and fourth fluid conduit means includes third pump means for causing the pressure of fluid within the second chamber to be less than the pressure of fluid within the third chamber for providing ultra filtration from the first organism to the second organism.

19. The apparatus of claim 18, wherein parallel fluid flow is arranged within the first and third fluid conduit means, and wherein the third pump means is associated with the fourth fluid conduit means.

20. The apparatus of claim 1, wherein the detector means includes a radiation detector.

21. The apparatus of claim 1, wherein the detector means comprises a radiation detector arranged to provide an alarm upon a fixed percentage decrease in the amount of a radioactive tracer within the physiological solution within the third chamber with respect to the original preset concentration of radioactive tracer.

22. The apparatus of claim 1, wherein the first and second membrane means each have surface areas not substantially greater than 3 square meters.

23. The apparatus of claim 22, wherein the first and second membrane means each have surface areas not substantially greater than 1 square meter.

24. The apparatus of claim 1, wherein the maximum maintainable size of any individual pore of the first membrane means is such that the first membrane means is substantially impermeable at least to molecules of molecular weight greater than 10,000.

25. The apparatus of claim 24, wherein the maximum maintainable size of any individual pore of the second membrane means is such that the second membrane means is substantially impermeable at least to molecules of molecular weight greater than 10,000.

* * * * *